(12) United States Patent
Chittibabu et al.

(10) Patent No.: US 12,373,248 B2
(45) Date of Patent: Jul. 29, 2025

(54) DYNAMIC THREAD MANAGEMENT FOR DISTRIBUTED APPLICATION SERVERS

(71) Applicant: Bank of America Corporation, Charlotte, NC (US)

(72) Inventors: Giridharan Chittibabu, Edison, NY (US); Ratnakar Chemudu, Belle Mead, NJ (US)

(73) Assignee: Bank of America Corporation, Charlotte, NC (US)

( * ) Notice: Subject to any disclaimer, the term of this patent is extended or adjusted under 35 U.S.C. 154(b) by 518 days.

(21) Appl. No.: 17/848,611

(22) Filed: Jun. 24, 2022

(65) Prior Publication Data

US 2023/0418665 A1 Dec. 28, 2023

(51) Int. Cl.
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | | |
|---|---|---|---|---|
| 6,874,010 B1 * | 3/2005 | Sargent | ................ | G06F 16/951 709/227 |
| 7,484,219 B2 * | 1/2009 | Mitra | .................... | G06F 16/275 707/999.1 |
| 7,937,703 B2 * | 5/2011 | Bethea | .................. | H04L 67/566 709/248 |
| 8,584,122 B2 * | 11/2013 | Ferrandiz | ................ | G06F 9/466 718/101 |
| 8,627,330 B2 * | 1/2014 | Mehta | .................... | G06F 9/4881 718/105 |
| 10,574,723 B2 * | 2/2020 | Khinvasara | ............. | H04L 67/60 |
| 11,163,606 B1 * | 11/2021 | Hampton | ................ | G06F 9/505 |
| 11,171,872 B1 | 11/2021 | McVeety et al. | | |
| 11,176,081 B2 | 11/2021 | Winston et al. | | |
| 11,184,194 B2 | 11/2021 | Jerolm | | |
| 11,204,812 B2 | 12/2021 | Amemiya | | |
| 11,231,977 B2 | 1/2022 | Grewal et al. | | |
| 11,238,295 B2 | 2/2022 | Papandreou et al. | | |
| 11,240,296 B2 | 2/2022 | Kawai et al. | | |
| 11,240,676 B2 | 2/2022 | Park et al. | | |
| 11,256,409 B2 | 2/2022 | Yao | | |
| 11,281,667 B2 | 3/2022 | Verma et al. | | |

(Continued)

*Primary Examiner* — Van H Nguyen
(74) *Attorney, Agent, or Firm* — Banner & Witcoff, Ltd.

(57) ABSTRACT

Aspects of the disclosure relate to batch processing at distributed servers. A computing platform may receive a first web service request, which may be a request for batch servicing. The computing platform may initiate a batch queue thread manager to process the first web service request, which may initiate a plurality of process threads, each configured to process, at any one time, a single job of the batch servicing. The computing platform may process, using the batch queue thread manager, the first web service request, which may include, by each of the plurality of process threads: 1) processing a first job of the batch servicing, and 2) processing, after completion of the first job, at least a second job of the batch servicing. After completion of the processing of the first web service request, the computing platform may output a response to the first web service request.

20 Claims, 8 Drawing Sheets

(56) References Cited

U.S. PATENT DOCUMENTS

| | | | |
|---|---|---|---|
| 11,294,736 B2 | 4/2022 | Arikuma et al. | |
| 11,302,055 B2 | 4/2022 | Desai et al. | |
| 11,309,077 B2 | 4/2022 | Katzman et al. | |
| 11,314,874 B2 | 4/2022 | Dande et al. | |
| 11,321,430 B2 | 5/2022 | Dande et al. | |
| 11,334,382 B2 * | 5/2022 | Bernat | G06F 16/2365 |
| 11,334,408 B2 | 5/2022 | Dande et al. | |
| 11,340,954 B2 | 5/2022 | Kurahashi | |
| 11,354,156 B2 | 6/2022 | Kim et al. | |
| 11,354,206 B2 | 6/2022 | Wada et al. | |
| 11,363,029 B2 | 6/2022 | Dande et al. | |
| 11,789,779 B2 * | 10/2023 | Kavali | G06F 9/4843 |
| | | | 718/101 |
| 2003/0182364 A1 * | 9/2003 | Large | G06F 9/4843 |
| | | | 709/203 |
| 2008/0209392 A1 * | 8/2008 | Able | G06F 8/34 |
| | | | 717/105 |
| 2009/0313628 A1 * | 12/2009 | Zhu | G06F 9/4843 |
| | | | 718/101 |
| 2019/0394096 A1 * | 12/2019 | Bernat | H04L 9/0637 |

* cited by examiner

DYNAMIC THREAD MANAGEMENT FOR DISTRIBUTED APPLICATION SERVERS

BACKGROUND

Aspects of the disclosure relate to distributed application servers and batch servicing. In some instances, batch or utility servers may rely on a main web service in application servers to process batch requests. In these instances, a number of batch servers and/or number of processing threads may be limited by a corresponding batch server configuration. As a result, attempts at batch processing may result in inefficiencies in processing resources and time delays, and further may cause delays and dependent applications and/or missed service level agreements (SLA).

SUMMARY

Aspects of the disclosure provide effective, efficient, scalable, and convenient technical solutions that address and overcome the technical problems associated with batch processing at distributed application servers. In accordance with one or more embodiments of the disclosure, a computing platform comprising at least one processor, a communication interface, and memory storing computer-readable instructions may receive a first web service request. The computing platform may identify that the first web service request is a request for batch servicing. The computing platform may initiate a batch queue thread manager to process the first web service request, where initiating the batch queue thread manager initiates a plurality of process threads, each configured to process, at any one time, a single job of the batch servicing. The computing platform may process, using the batch queue thread manager, the first web service request, where the first web service request includes, by each of the plurality of process threads: 1) processing a first job of the batch servicing, and 2) processing, after completion of the first job, at least a second job of the batch servicing. After completion of the processing of the first web service request, the computing platform may output a response to the first web service request.

In one or more instances, the computing platform may receive a second web service request. The computing platform may identify that the second web service request is an individual service request. The computing platform may process, without use of the batch queue thread manager, the second web service request.

In one or more examples, the first web service request and the second web service request may be processed simultaneously. In one or more examples, receiving the first web service request may include receiving, at one of a plurality of application servers and from a batch utility server, the first web service request, where additional web service requests may be routed to the remaining application servers of the plurality of application servers.

In one or more instances, processing the first web service request may include dynamically throttling a number of process threads in the plurality of process threads during the processing of the first web service request. In one or more instances, throttling the number of process threads may include adding one or more process threads to the plurality of process threads or removing one or more process threads from the plurality of process threads.

In one or more examples, dynamically throttling the number of process threads may include changing a number of process threads in the plurality of process threads based on one or more of: available processing power of a computer processing unit (CPU) of the computing platform, available memory of the computing platform, a configuration of the plurality of process threads, or a volume of data corresponding to the first web service request. In one or more examples, processing of the first web service request may occur simultaneously with processing of a second web service request, which may be an individual service request, and throttling the number of process threads may include throttling, based on the second web service request, the number of process threads. In one or more instances, the computing platform may dynamically set, using a machine learning model and prior to processing the first web service request, a number of process threads in the plurality of process threads based on one or more of: a type of request comprising the first web service request, available processing power of a CPU of the computing platform, available memory of the computing platform, a configuration of the plurality of process threads, or a volume of data corresponding to the first web service request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure provide systems and methods to improve batch processing efficiency and error detection in distributed application servers. For example, several applications may rely on a main web service in application servers to perform core processing, which may be invoked from a batch queue at a batch or utility server. In this model, the capacity of all application servers might not be fully utilized even if the batch servers make multiple web service requests to application servers in parallel. The batch servers may be limited in number as compared to application servers and the number of threads that may be invoked may also be limited to the batch server configuration. This inefficiency may cause the batch process to run longer, thus taking away resources and time. Sometimes, the long running batch processes may cause delays in dependent applications and/or missed service level agreements (SLAs).

With the conventional batch processing model where a few utility or batch servers process a batch queue and invoke a main web service in application servers to do the processing, the batch efficiency may be limited by the number of batch servers and threads that it may invoke. With the arrangements described herein, all application servers may be utilized to the fullest capacity, and batch processing may be completed in the shortest amount of time.

When a batch request is sent to the web service in an application server, the web service may process the incoming request, and may internally spawn multiple parallel threads based on an application configuration, and send a response back to the batch server. Each of the new threads in the web service may now act as an independent batch queue processor that may read from the same queue that the batch server reads, and process the queue. As a result, the total parallel processing of the batch queue is now increased significantly.

As a particular example, two batch/utility servers may be used, along with ten application servers. In a first scenario, each of the two batch servers may make a single web service call to the ten application servers sequentially, thus resulting in two batch requests being processed at any moment. In a second scenario, each of the two batch servers may make ten parallel web service calls to the ten application servers, thus resulting in twenty batch requests being processed at any moment. In yet a third scenario (representative of the systems and methods described herein), each of the two batch servers may make ten parallel web service calls to the application servers (as described in scenario two). Additionally, each of the ten application servers may also spawn ten parallel threads internally, and start processing the batch queue from the application server. Accordingly, at any moment there may be 120 (20+100) batch requests processed across the batch and application servers. Clearly, the methods proposed in scenario three achieve significantly increased batch efficiency.

Accordingly, the batch efficiency may be tremendously improved without additional infrastructure. Additionally, the number of threads running in the application servers may be throttled up or down dynamically depending on the server capacity and load. Each threaded process in the application servers may act as an independent batch process. The execution time of the batch may be reduced by several fold depending on the number of application severs executing in these arrangements. Since the execution time is reduced, robust reprocessing of any errors may be quickly carried out.

Figure 1A:
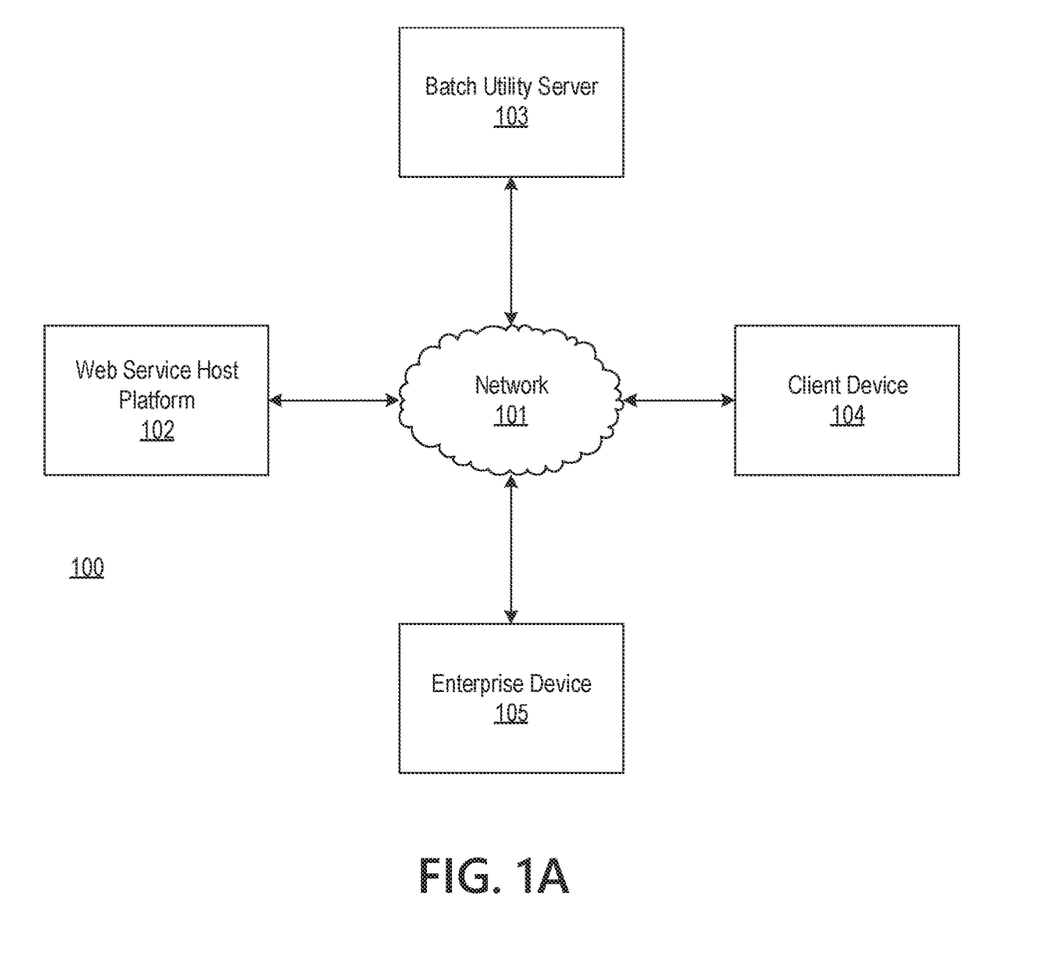
FIGS. 1A-1B depict an illustrative computing environment that implements a dynamic thread manager for improved processing across a distributed plurality of application servers in accordance with one or more example embodiments.
Figure 1B:
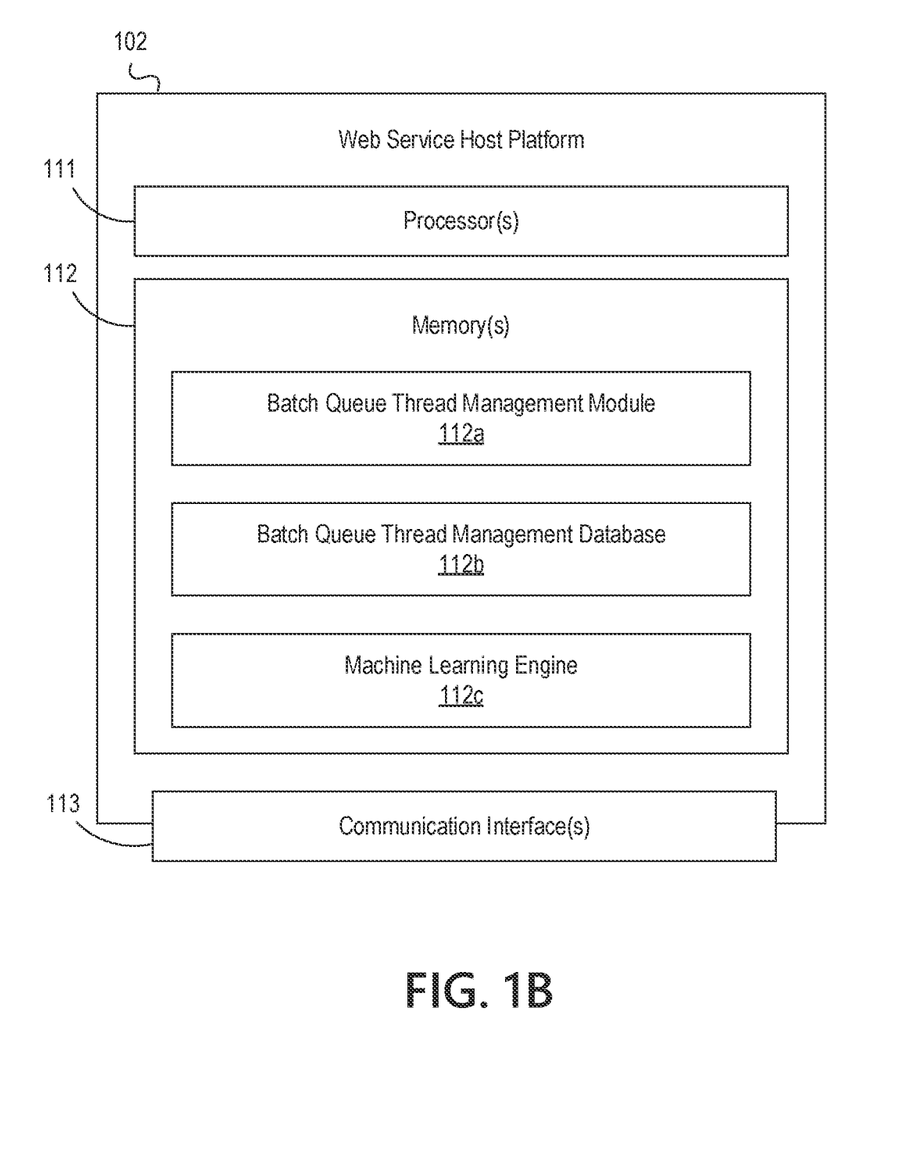

FIGS. 1A-1B depict an illustrative computing environment that implements a dynamic thread manager for improved processing across a distributed plurality of application servers in accordance with one or more example embodiments. Referring to FIG. 1A, computing environment 100 may include one or more computer systems. For example, computing environment 100 may include a web service host platform 102, a batch utility server 103, a client device 104, and an enterprise device 105.

As described further below, web service host platform 102 may be a computer system that includes one or more computing devices (e.g., servers, server blades, or the like) and/or other computer components (e.g., processors, memories, communication interfaces) that may host a dynamic thread manager for batch processing. In some instances, the web service host platform 102 may be or otherwise include an application server, configured to dynamically process jobs of a batch query using a plurality of process threads. In some instances, the web service host platform 102 may be configured to dynamically throttle the number of process threads, either to increase or decrease the number. Although a single web service host platform is shown, any number of batch utility servers may be implemented without departing from the scope of the disclosure.

Batch utility server 103 may be a server, server blade, or the like configured for batch processing. For example, the batch server may be configured to receive queries, and to communicate with the web service host platform 102 for processing. Although a single batch utility server 103 is shown, any number of batch utility servers may be implemented without departing from the scope of the disclosure.

Client device 104 may be a laptop computer, desktop computer, tablet, smart phone, and/or other computing device, which may be used to initiate a processing request to the batch utility server 103. In some instances, once the request has been processed, the client device 104 may be configured to display results of the request (e.g., via an interface of the client device 104). In some instances, the client device 104 may be associated with a customer or client of an enterprise organization, such as a financial institution. Although a single client device is shown, any number of client devices may be implemented without departing from the scope of the disclosure.

Enterprise device 105 may be a laptop computer, desktop computer, tablet, smart phone, and/or other computing device, which may be used to initiate a processing request to the batch utility server 103. In some instances, once the request has been processed, the enterprise device 105 may be configured to display results of the request (e.g., via an interface of the enterprise device 105). In some instances, the enterprise device 105 may be associated with an agent or employee of an enterprise organization, such as a financial institution. Although a single enterprise device is shown, any number of enterprise devices may be implemented without departing from the scope of the disclosure.

Computing environment 100 also may include one or more networks, which may interconnect web service host platform 102, batch utility server 103, client device 104, enterprise device 105, or the like. For example, computing environment 100 may include a network 101 (which may interconnect, e.g., web service host platform 102, batch utility server 103, client device 104, enterprise device 105, or the like).

In one or more arrangements, web service host platform 102, batch utility server 103, client device 104, and/or enterprise device 105 may be any type of computing device capable of sending and/or receiving requests and processing the requests accordingly. For example, web service host platform 102, batch utility server 103, client device 104, enterprise device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of web service host platform 102, batch utility server 103, client device 104, and enterprise device 105 may, in some instances, be special-purpose computing devices configured to perform specific functions.

Referring to FIG. 1B, web service host platform 102 may include one or more processors 111, memory 112, and communication interface 113. A data bus may interconnect processor 111, memory 112, and communication interface 113. Communication interface 113 may be a network interface configured to support communication between web service host platform 102 and one or more networks (e.g., network 101, or the like). Memory 112 may include one or more program modules having instructions that when executed by processor 111 cause web service host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of web service host platform 102 and/or by different computing devices that may form and/or otherwise make up web service host platform 102. For example, memory 112 may have, host, store, and/or include batch queue thread management module 112a, batch queue thread management database 112b, and a machine learning engine 112c.

Batch queue thread management module 112a may have instructions that direct and/or cause web service host platform 102 to execute advanced batch processing and dynamic thread management techniques, as discussed in greater detail below. Batch queue thread management database 112b may store information used by batch queue thread management module 112a and/or web service host platform 102 in application of batch processing and dynamic thread management techniques, and/or in performing other functions. Machine learning engine 112c may have instructions that direct and/or cause the web service host platform 102 to set, define, and/or iteratively refine optimization rules and/or other parameters used by the web service host platform 102 and/or other systems in computing environment 100.

Figure 2A:
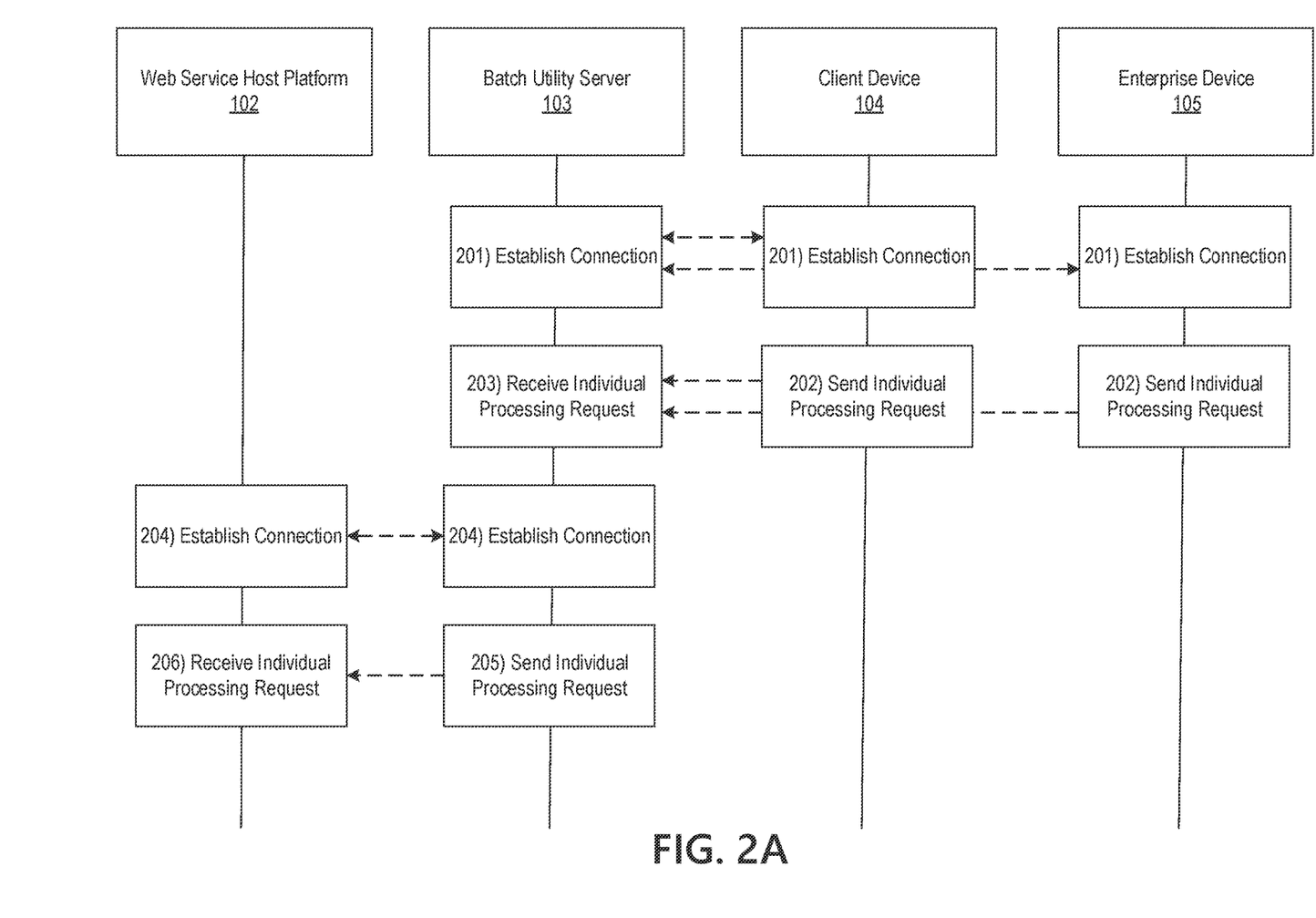
FIGS. 2A-2D depict an illustrative event sequence that implements a dynamic thread manager for improved processing across a distributed plurality of application servers in accordance with one or more example embodiments.

FIGS. 2A-2D depict an illustrative event sequence that implements a dynamic thread manager for improved processing across a distributed plurality of application servers in accordance with one or more example embodiments. Referring to FIG. 2A, at step 201, the client device 104 and/or enterprise device 105 may establish wireless data connections with the batch utility server 103. For example, the client device 104 and/or enterprise device 105 may establish first and/or second wireless data connections with the batch utility server 103 to link the client device 104 and/or enterprise device 105 to the batch utility server 103 (e.g., in preparation for sending processing requests). In some instances, the client device 104 and/or enterprise device 105 may identify whether a connection is already established with the batch utility server 103. If a connection is already established, the client device 104 and/or enterprise device 105 might not re-establish the connection. Otherwise, if a connection is not yet established, the client device 104 and/or enterprise device 105 may establish the first and/or second wireless data connection as described herein.

At step 202, the client device 104 and/or enterprise device 105 may send an individual processing request (which may, e.g., be a web service request) to the batch utility server 103. For example, the client device 104 and/or enterprise device 105 may send a request to perform a single task, job, function, or the like (e.g., not a batch processing request), such as accessing account information for a particular user. In some instances, the client device 104 and/or enterprise device 105 may send the individual processing request while the first and/or second wireless data connections are established.

At step 203, the batch utility server 103 may receive the individual processing request sent at step 202. For example, the batch utility server 103 may receive the individual processing request while the first and/or second wireless data connections are established.

At step 204, the batch utility server 103 may establish a connection with the web service host platform 102. For example, the batch utility server 103 may establish a third wireless data connection with the web service host platform 102 to link the batch utility server 103 to the web service host platform 102 (e.g., in preparation for sending processing requests). In some instances, the batch utility server 103 may identify whether a connection is already established with the web service host platform 102. If a connection is already established with the web service host platform 102, the batch utility server 103 might not re-establish the connection. If a connection is not yet established with the web service host platform 102, the batch utility server 103 may establish the third wireless data connection as described herein.

At step 205, the batch utility server 103 may send the individual processing request (which may, e.g., be a web service request) to the web service host platform 102 for processing. For example, the batch utility server 103 may send the individual processing request while the third wireless data connection is established.

At step 206, the web service host platform 102 may receive the individual processing request, sent at step 205. For example, the web service host platform 102 may receive the individual processing request via the communication interface 113 and while the third wireless data connection is established.

Figure 2B:
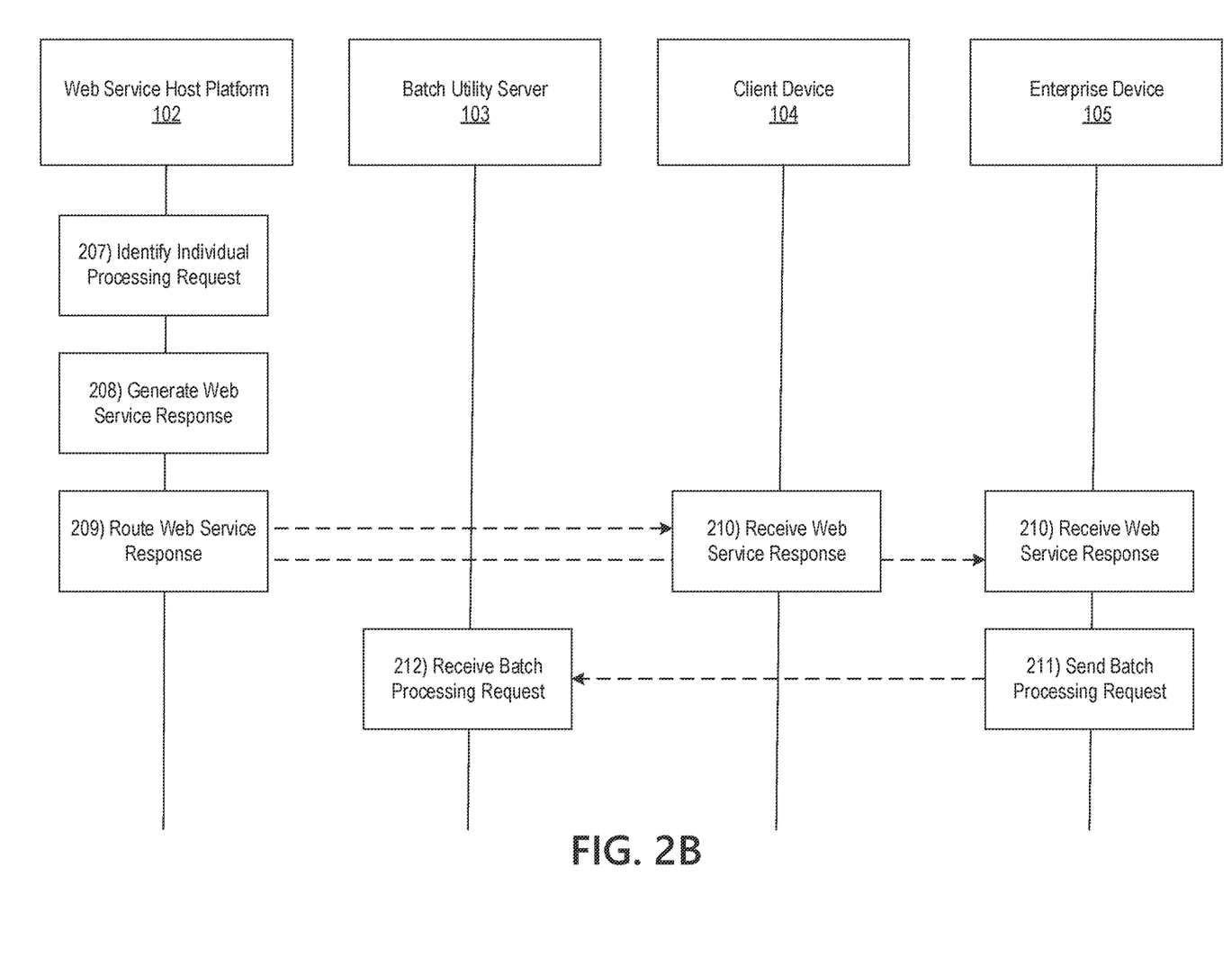

Referring to FIG. 2B, at step 207, the web service host platform 102 may analyze the individual processing request, received at step 206, to identify that it is an individual processing request (e.g., as compared to a batch processing request). For example, the web service host platform 102 may identify that a single task or job is requested.

At step 208, the web service host platform 102 may generate a web service response to the individual processing request. For example, the web service host platform 102 may generate or otherwise identify account information and/or other information, and/or perform additional tasks requested by the individual processing request. In these instances, the web service host platform 102 may process the individual processing request without routing it to the batch queue thread manager (e.g., which is described further below with regard to processing of the batch processing request).

At step 209, the web service host platform 102 may route the web service response to the client device 104 and/or the enterprise device 105. In some instances, the web service host platform 102 may route the web service response to the client device 104 and/or the enterprise device 105 directly. In other instances, the web service host platform 102 may route the web service response to the client device 104 and/or the enterprise device 105 via the batch utility server 103. In some instances, the web service host platform 102 may also send one or more commands directing the client device 104 and/or enterprise device 105 to display the web service response.

In some instances, in addition or as an alternative to routing the web service response to the client device 104 and/or the enterprise device 105, the web service host platform 102 may store the web service response (e.g., locally, on the cloud, at an external data storage system, and/or otherwise).

Figure 4:
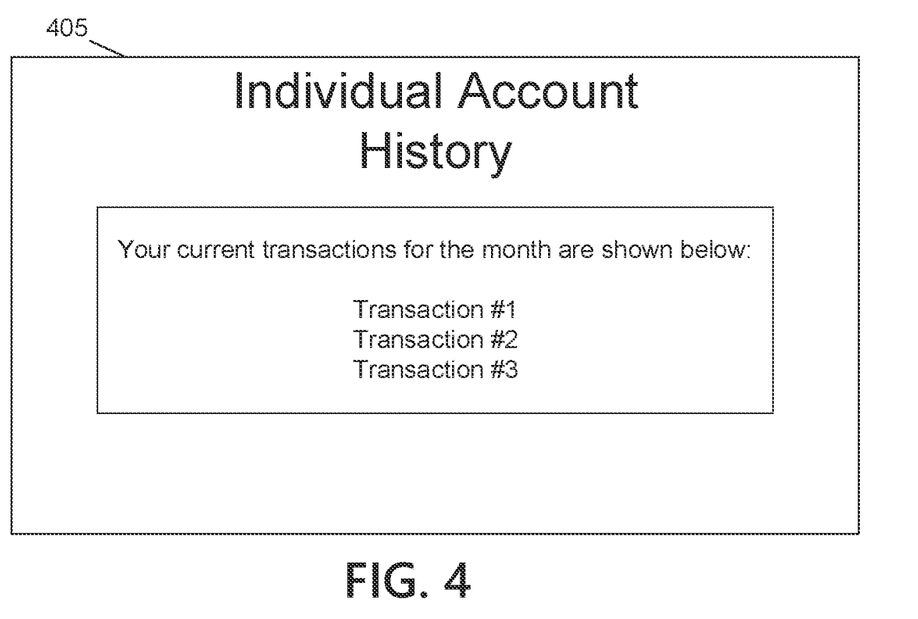
FIGS. 4 and 5 depict graphical user interfaces generated using a dynamic thread manager for improved processing across a distributed plurality of application servers in accordance with one or more example embodiments.

At step 210, the client device 104 and/or the enterprise device 105 may receive the web service response sent at step 209. In some instances, the client device 104 and/or enterprise device 105 may receive the one or more commands directing the client device 104 and/or the enterprise device 105 to display the web service response. In these instances, based on or in response to the one or more commands directing the client device 104 and/or the enterprise device 105 to display the web service response, the client device 104 and/or the enterprise device 104 may display a graphical user interface similar to graphical user interface 405, which is shown in FIG. 4. For example, the client device 104 may display requested account information, such as current monthly transactions.

At step 211, the enterprise device 105 may send a batch processing request (which may, e.g., be a web service request) to the batch utility server 103. For example, the enterprise device 105 may send a request to perform a number of tasks, jobs, or the like (e.g., a single task of job being repeated a number of times, e.g., for each of a plurality of individuals). For example, the enterprise device 105 may send a request to generate a quarterly (or other predetermined interval) statement for all (or a subset of) customers. In some instances, the enterprise device 105 may send the batch processing request to the batch utility server 103 while the second wireless data connection is established.

At step 212, the batch utility server 103 may receive the batch processing request sent at step 211. For example, the batch utility server 103 may receive the batch processing request via the communication interface 113 and while the second wireless data connection is established.

Figure 2C:
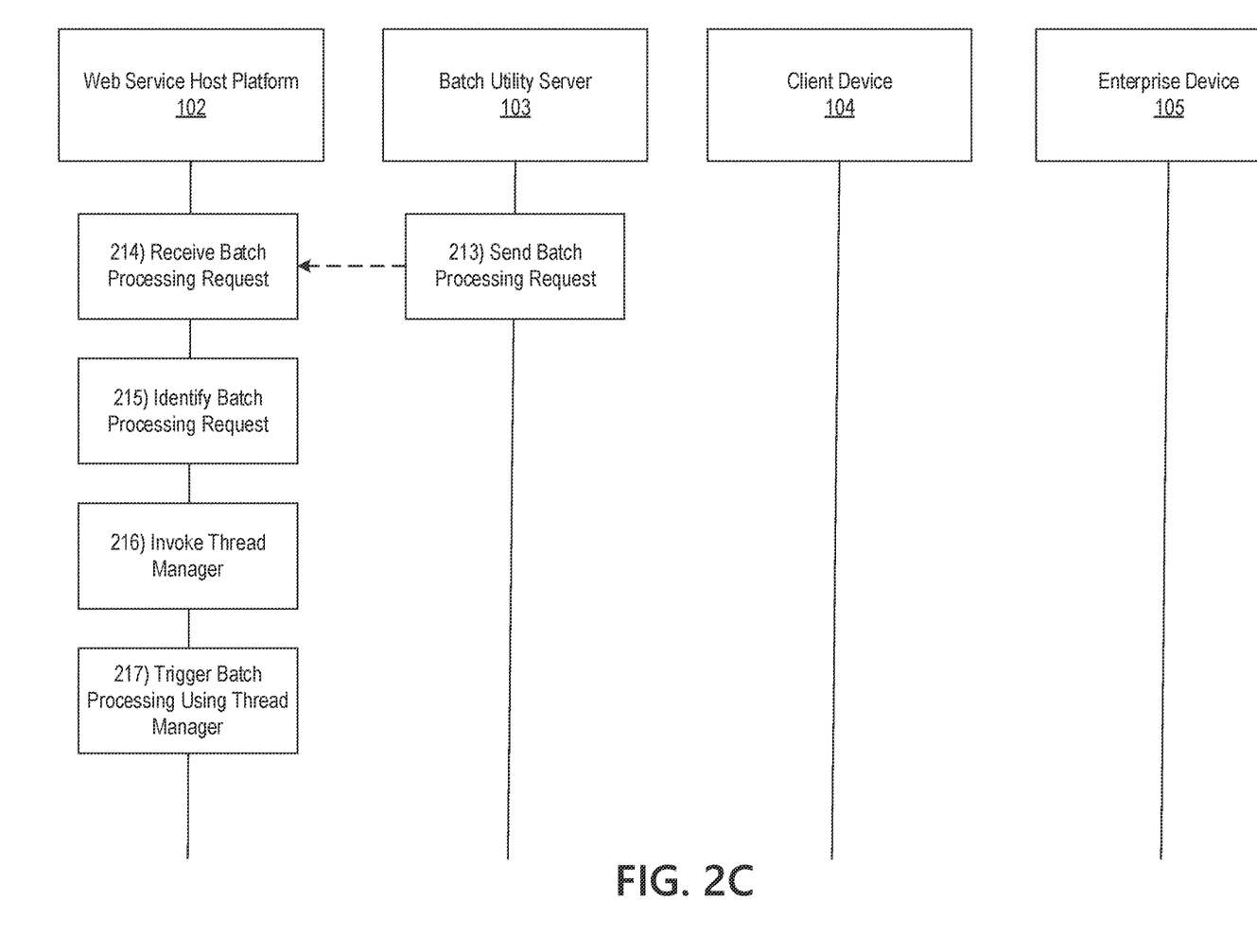

Referring to FIG. 2C, at step 213, the batch utility server 103 may send the batch processing request (which may, e.g., be a web service request) to the web service host platform 102 for processing. For example, the batch utility server 103 may send the batch processing request while the third wireless data connection is established.

At step 214, the web service host platform 102 may receive the batch processing request, sent at step 213. For example, the web service host platform 102 may receive the batch processing request via the communication interface 113 and while the third wireless data connection is established.

At step 215, the web service host platform 102 may analyze the batch processing request, received at step 214, to identify that it is a batch processing request (e.g., as compared to an individual processing request as described above). For example, the web service host platform 102 may identify that repetition of a task or job is requested on behalf of a plurality of individuals.

At step 216, based on identifying that batch processing is requested, the web service host platform 102 may invoke the batch queue thread manager, which may, e.g., provide independent queue processing within a web service hosted or otherwise supported by the web service host platform 102. For example, the web service host platform 102 may initiate a plurality of process threads, which may be used to process jobs, tasks, or the like of the batch processing request in parallel.

In some instances, in initiating the plurality of process threads, the web service host platform 102 may initiate a predetermined number of threads. Alternatively, using a machine learning model, the web service host platform 102 may identify, based on the type of request made in the batch processing request and/or other conditions of the web service host platform 102 (e.g., available processing power of a computer processing unit (CPU) of the computing platform, available memory of the computing platform, a configuration of the plurality of process threads, a volume of data corresponding to the first web service request, and/or other information), a number of threads to initiate. For example, the web service host platform 102 may have pre-trained a machine learning model to output an optimal (i.e., balances processing resources with computational time) number of process threads to use under various conditions and/or for various types of requests. In some instances, the web service host platform 102 may initially train the machine learning model in a supervised manner (e.g., using labelled data). Additionally or alternatively, the web service host platform 102 may continue to learn in an unsupervised manner based on outputs from the model and the corresponding conditions under which the outputs were determined. In such instances where a machine learning model is used, the web service host platform 102 may initiate a number of process threads based on the output of the machine learning model.

At step 217, once an initial number of process threads have been triggered, the web service host platform 102 may trigger batch processing using the batch queue thread manager and the corresponding process threads. For example, the web service host platform 102 may use the batch queue thread manager to dispatch a single job or task, corresponding to the batch processing request, to each initiated process thread. For example, the web service host platform 102 may communicate with the batch utility server 103 to access a batch queue table, which may include a list of all jobs, tasks, or the like to be processed.

The batch queue thread manager may monitor performance of each process thread and may obtain a new set of jobs, tasks, or the like to be performed by the process threads once the initial set is completed. The batch queue thread manager may continue to repeat this procedure until all jobs, tasks, events, or the like from the batch queue table have been processed.

In some instances, during this processing, the web service host platform 102 may monitor its performance, and may dynamically throttle the number of process threads accordingly. For example, the web service host platform 102 may throttle the number of process threads (e.g., add or remove threads) based on one or more of: available processing power of a CPU of the web service host platform 102, available memory of the web service host platform 102, a configuration of the plurality of process threads, or a volume of data corresponding to the first web service request. For example, if the web service host platform 102 may use the machine learning model (described above) to identify the most optimal number of process threads in view of current processing conditions (similar to as described above with regard to identifying the initial number of process threads).

In some instances, in training the machine learning model, the web service host platform 102 may set one or more ranges, which may indicate when an additional thread should be added and/or an existing thread should be removed. For example, the web service host platform 102 may train the machine learning model to add an additional thread if utilization, memory, and/or other indicators of processing capacity drop below 60%, and/or to remove an existing thread if these factors exceed 90%.

In doing so, the web service host platform 102 may dynamically adjust so as to process the maximum number of tasks, events, jobs, or the like at any one time without overloading the processing capabilities of the web service host platform 102 (which may, e.g., cause errors, outages, delayed processing, and/or other errors).

In some instances, individual processing requests (such as the individual processing request described above in steps 201-210) may be received and/or processed by the web service host platform 102 simultaneously with the batch processing described at step 217. In these instances, processing of such individual processing requests may affect available memory and/or processing resources of the web service host platform 102. Accordingly, the web service host platform 102 may take into account the impact of such processing when identifying the most optimal number of process threads and may throttle the number of threads accordingly.

As each job, task, event, or the like of the batch processing request is handled, the batch queue table, from which each job, task, event, or the like is selected, may be updated to reflect its completion. The web service host platform 102 may continue to perform these processes (e.g., pulling from the batch queue table, monitoring the processing capabilities, dynamically adjusting a number of threads, etc.) until all tasks, events, jobs, or the like of the batch processing request have been completed. For example, the web service host platform 102 may process, at each thread, a first job of the batch processing request (batch servicing), and may subsequently process, after completion of the first job, at least a second job of the batch processing request (batch servicing).

By processing the batch processing request in this way, the web service host platform 102 may increase processing speed when compared to batch processing techniques that do not include such additional process threads at the application servers. For example, rather than merely routing a single task, job, event, or the like to each application server to complete a batch service request, multiple requests may be routed and subsequently processed by each application server (e.g., web service host platform 102) so as to utilize all available processing resources of each application server. Similarly, by dynamically throttling the number of available processing threads, the web service host platform 102 may further maximize processing speed while balancing available resources. Furthermore, by reducing the time needed to complete such batch processing requests, the speed of error identification may be increased. For example, any errors in the processing may be identified quicker, and may thus be remediated or otherwise addressed in a shorter amount of time.

Figure 2D:
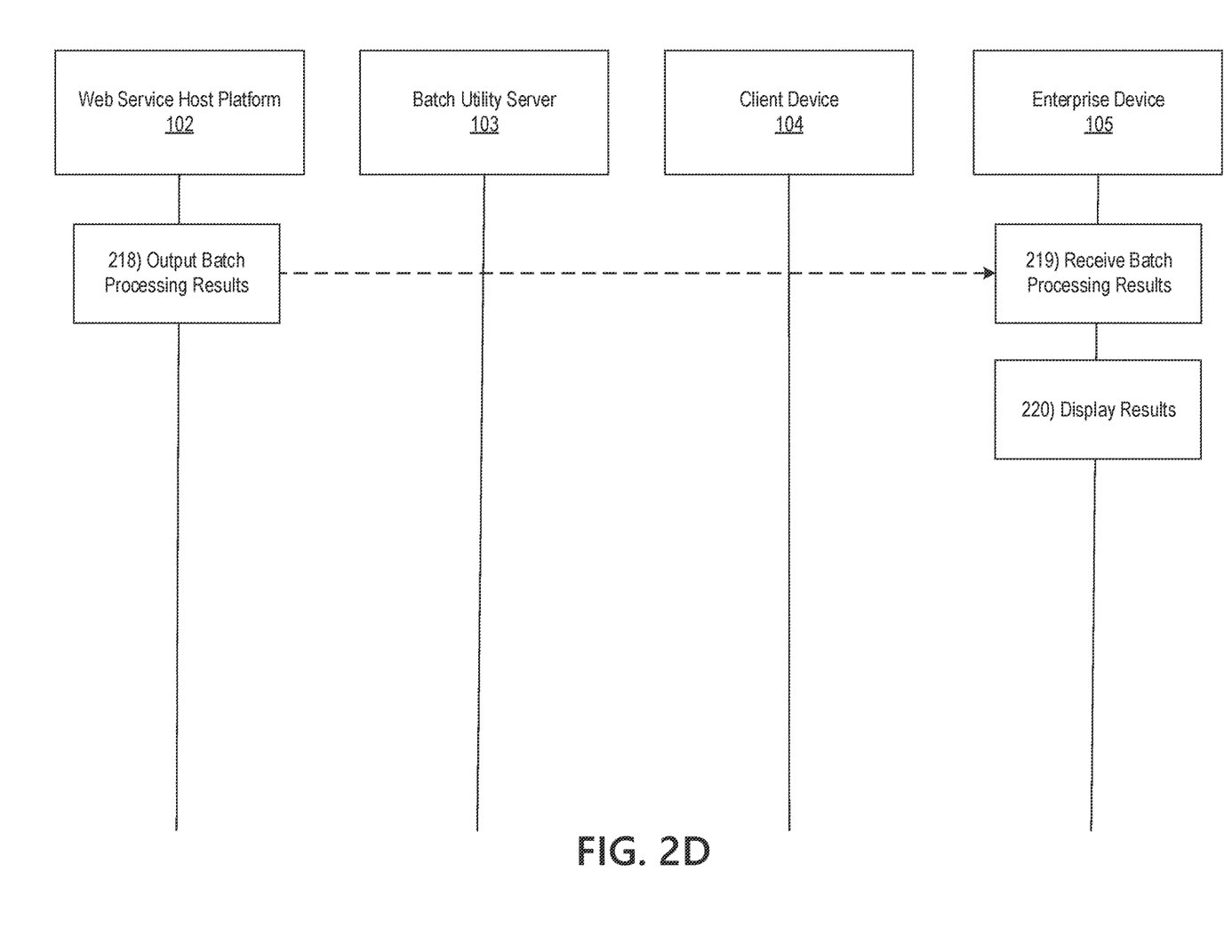

Referring to FIG. 2D, at step 218, the web service host platform 102 may output the batch processing results to the enterprise device 105. In some instances, the web service host platform 102 may output the batch processing results once the batch processing request has been processed in its entirety. In other instances, the web service host platform 102 may output the batch processing results in real time as each result (e.g., each job, task, event, or the like) is produced. In some instances, the web service host platform 102 may communicate directly with the enterprise device 105. In other instances, the web service host platform 102 may communicate with the enterprise device 105 via the batch utility server 103. In some instances, the web service host platform 102 may also send one or more commands directing the enterprise user device 105 to display the batch processing results. In some instances, in addition or as an alternative to sending the batch processing results to the enterprise device 105, the web service host platform 102 may cause the batch processing results to be stored (e.g., locally, on the cloud, at a remote storage system, and/or otherwise).

At step 219, the enterprise device 105 may receive the batch processing results sent at step 218. In some instances, the enterprise device 105 may receive the batch processing results directly from the web service host platform 102 or via the batch utility server 103. In some instances, the enterprise device 105 may also receive one or more commands directing the enterprise device 105 to display the batch processing results.

Figure 5:
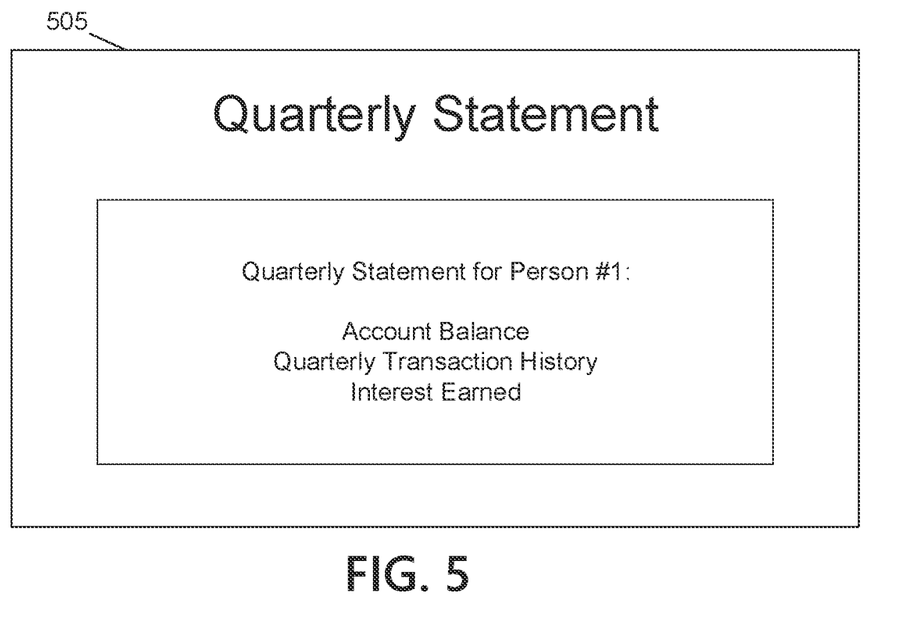

At step 220, based on or in response to the one or more commands directing the enterprise device 105 to display the batch processing results, the enterprise device 105 may display the batch processing results. For example, the enterprise device 105 may display a graphical user interface similar to graphical user interface 505, which is illustrated in FIG. 5, and which shows a quarterly statement for a particular individual (which may, e.g., have been processed along with quarterly statements for a number of other individuals as well). Additionally or alternatively, if any errors were identified during the batch processing, the enterprise device 105 may display such errors.

Although steps 201-220 describe an enhanced batch processing process between a web service host platform 102, batch utility server 103, client device 104, and enterprise device 105, this configuration is illustrative, and any number of such devices may be used to implement the methods described herein without departing from the scope of the disclosure. For example, the batch utility server 103 may route processing requests to a plurality of application servers, such as the web service host platform 102, which may be configured to process requests as described above with regard to the web service host platform 102. Similarly, although the batch service request is illustrated as being routed to the web service host platform 102 via a single batch utility server 103, any number of batch utility servers may be used to route such requests to any number of application servers.

Figure 3:
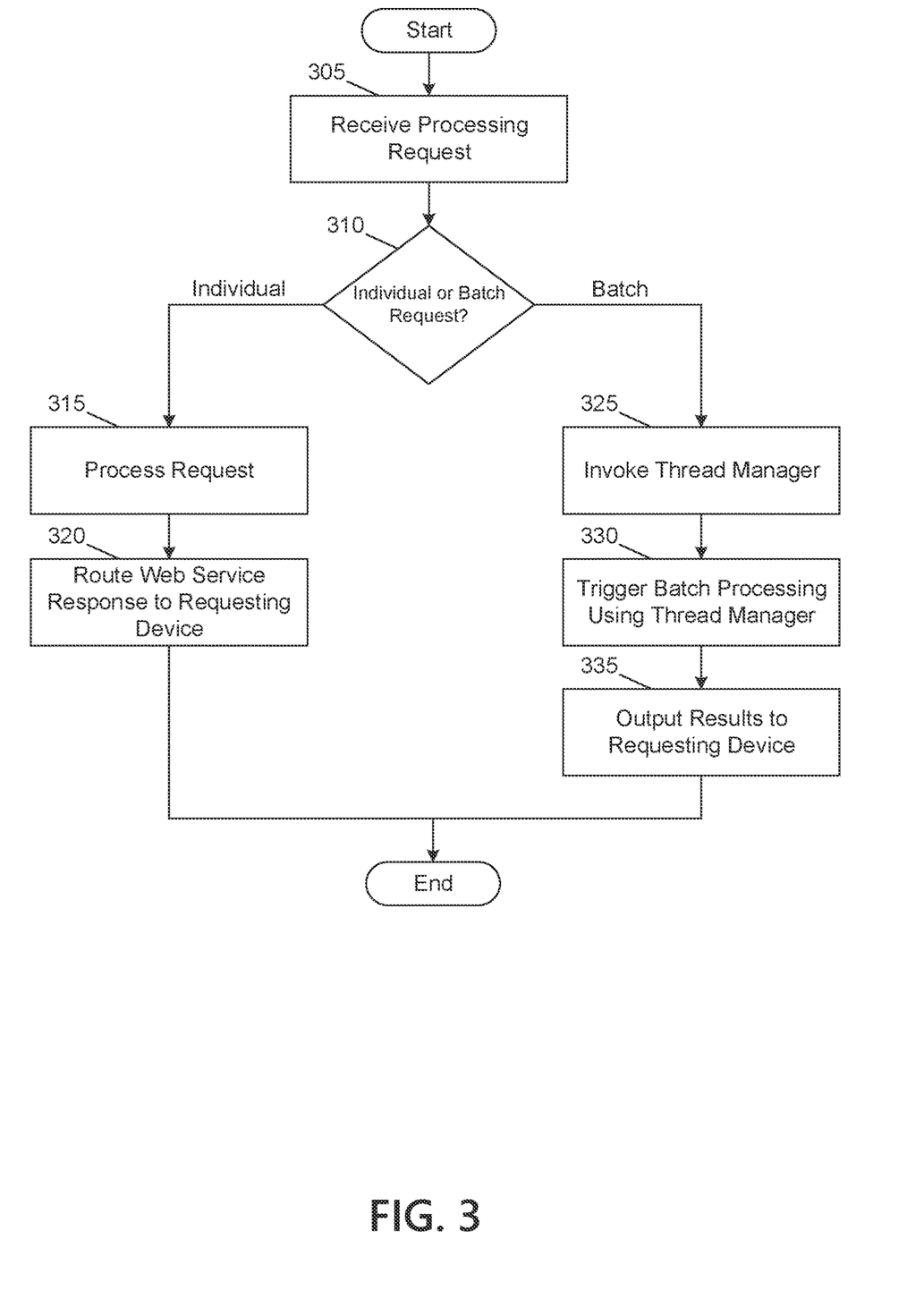
FIG. 3 depicts an illustrative method that implements a dynamic thread manager for improved processing across a distributed plurality of application servers in accordance with one or more example embodiments.

FIG. 3 depicts an illustrative method for improved processing across a distributed plurality of application servers in accordance with one or more example embodiments. Referring to FIG. 3, at step 305, a computing platform having at least one processor, a communication interface, and memory may receive a processing request. At step 310, the computing platform may identify whether the processing request comprises an individual or batch processing request. If the request is an individual request, the computing platform may proceed to step 315.

At step 315, the computing platform may process the request. At step 320, the computing platform may route a web service response to the requesting device for display.

Returning to step 310, if the processing request was a batch request, the computing platform may proceed to step 325. At step 325, the computing platform may invoke a thread manager. At step 330, the computing platform may use the thread manager to trigger batch processing. At step 335, the computing platform may output results of the batch processing to the requesting device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
     receive a first web service request;
     identify that the first web service request comprises a request for batch servicing;
     initiate a batch queue thread manager to process the first web service request, wherein initiating the batch queue thread manager initiates a plurality of process threads, each configured to process, at any one time, a single job of the batch servicing, and wherein each of the plurality of process threads reads from a same queue as the computing platform;
     dynamically set, using a machine learning model and prior to processing the first web service request, a number of process threads in the plurality of process threads based on: a type of request comprising the first web service request, available processing power of a computer processing unit (CPU) of the computing platform, available memory of the computing platform, a configuration of the plurality of process threads, and a volume of data corresponding to the first web service request, wherein dynamically setting the number of process threads configures the computing platform to process a maximum number of jobs without overloading processing capabilities of the computing platform;
     process, using the batch queue thread manager, the first web service request, wherein processing the first web service request comprises, by each of the plurality of process threads:
       processing a first job of the batch servicing, and
       processing, after completion of the first job, at least a second job of the batch servicing, wherein use of the plurality of process threads improves processing efficiency for the request for batch servicing without the use of additional hardware infrastructure, wherein the improved processing efficiency is associated with a reduced execution time when compared to processing of the request for batch servicing without use of the plurality of process threads, and wherein detected errors are efficiently processed due to the reduced execution time; and
     after completion of the processing of the first web service request, output a response to the first web service request.

2. The computing platform of claim 1, wherein the memory stores additional computer-readable instructions that, when executed by the at least one processor, further cause the computing platform to:
   receive a second web service request;
   identify that the second web service request comprises an individual service request; and
   process, without use of the batch queue thread manager, the second web service request.

3. The computing platform of claim 2, wherein the first web service request and the second web service request are processed simultaneously.

4. The computing platform of claim 1, wherein receiving the first web service request comprises:
   receiving, at one of a plurality of application servers and from a batch utility server, the first web service request, wherein additional web service requests are routed to the remaining application servers of the plurality of application servers.

5. The computing platform of claim 1, wherein processing the first web service request comprises dynamically throttling a number of process threads in the plurality of process threads during the processing of the first web service request.

6. The computing platform of claim 5, wherein throttling the number of process threads comprises adding one or more process threads to the plurality of process threads or removing one or more process threads from the plurality of process threads.

7. The computing platform of claim 5, wherein dynamically throttling the number of process threads comprises changing a number of process threads in the plurality of process threads based on: the available processing power of the CPU of the computing platform, the available memory of the computing platform, the configuration of the plurality of process threads, and the volume of data corresponding to the first web service request.

8. The computing platform of claim 5, wherein processing of the first web service request occurs simultaneously with processing of a second web service request, comprising an individual service request, and wherein throttling the number of process threads comprises throttling, based on the second web service request, the number of process threads.

9. A method comprising:
at a computing platform comprising at least one processor, a communication interface, and memory:
receiving a first web service request;
identifying that the first web service request comprises a request for batch servicing;
initiating a batch queue thread manager to process the first web service request, wherein initiating the batch queue thread manager initiates a plurality of process threads, each configured to process, at any one time, a single job of the batch servicing, and wherein each of the plurality of process threads reads from a same queue as the computing platform;
dynamically setting, using a machine learning model and prior to processing the first web service request, a number of process threads in the plurality of process threads based on: a type of request comprising the first web service request, available processing power of a computer processing unit (CPU) of the computing platform, available memory of the computing platform, a configuration of the plurality of process threads, and a volume of data corresponding to the first web service request, wherein dynamically setting the number of process threads configures the computing platform to process a maximum number of jobs without overloading processing capabilities of the computing platform;
processing, using the batch queue thread manager, the first web service request, wherein processing the first web service request comprises, by each of the plurality of process threads:
processing a first job of the batch servicing, and
processing, after completion of the first job, at least a second job of the batch servicing, wherein use of the plurality of process threads improves processing efficiency for the request for batch servicing without the use of additional hardware infrastructure, wherein the improved processing efficiency is associated with a reduced execution time when compared to processing of the request for batch servicing without use of the plurality of process threads, and wherein detected errors are efficiently processed due to the reduced execution time; and
after completion of the processing of the first web service request, outputting a response to the first web service request.

10. The method of claim 9, further comprising:
receiving a second web service request;
identifying that the second web service request comprises an individual service request; and
processing, without use of the batch queue thread manager, the second web service request.

11. The method of claim 10, wherein the first web service request and the second web service request are processed simultaneously.

12. The method of claim 9, wherein receiving the first web service request comprises:
receiving, at one of a plurality of application servers and from a batch utility server, the first web service request, wherein additional web service requests are routed to the remaining application servers of the plurality of application servers.

13. The method of claim 9, wherein processing the first web service request comprises dynamically throttling a number of process threads in the plurality of process threads during the processing of the first web service request.

14. The method of claim 13, wherein throttling the number of process threads comprises adding one or more process threads to the plurality of process threads or removing one or more process threads from the plurality of process threads.

15. The method of claim 13, wherein dynamically throttling the number of process threads comprises changing a number of process threads in the plurality of process threads based on: the available processing power of the CPU of the computing platform, the available memory of the computing platform, the configuration of the plurality of process threads, and the volume of data corresponding to the first web service request.

16. The method of claim 13, wherein processing of the first web service request occurs simultaneously with processing of a second web service request, comprising an individual service request, and wherein throttling the number of process threads comprises throttling, based on the second web service request, the number of process threads.

17. One or more non-transitory computer-readable media storing instructions that, when executed by a computing platform comprising at least one processor, a communication interface, and memory, cause the computing platform to:
receive a first web service request;
identify that the first web service request comprises a request for batch servicing;
initiate a batch queue thread manager to process the first web service request, wherein initiating the batch queue thread manager initiates a plurality of process threads, each configured to process, at any one time, a single job of the batch servicing, and wherein each of the plurality of process threads reads from a same queue as the computing platform;
dynamically set, using a machine learning model and prior to processing the first web service request, a number of process threads in the plurality of process threads based on: a type of request comprising the first web service request, available processing power of a computer processing unit (CPU) of the computing platform, available memory of the computing platform, a configuration of the plurality of process threads, and a volume of data corresponding to the first web service request, wherein dynamically setting the number of process threads configures the computing platform to process a maximum number of jobs without overloading processing capabilities of the computing platform;

process, using the batch queue thread manager, the first web service request, wherein processing the first web service request comprises, by each of the plurality of process threads:

processing a first job of the batch servicing, and processing, after completion of the first job, at least a second job of the batch servicing, wherein use of the plurality of process threads improves processing efficiency for the request for batch servicing without the use of additional hardware infrastructure, wherein the improved processing efficiency is associated with a reduced execution time when compared to processing of the request for batch servicing without use of the plurality of process threads, and wherein detected errors are efficiently processed due to the reduced execution time; and after completion of the processing of the first web service request, outputting a response to the first web service request.

18. The one or more non-transitory computer-readable media of claim 17, wherein the memory stores additional computer-readable instructions that, when executed by the at least one processor, further cause the computing platform to:

receive a second web service request;

identify that the second web service request comprises an individual service request; and process, without use of the batch queue thread manager, the second web service request.

19. The one or more non-transitory computer-readable media of claim 18, wherein the first web service request and the second web service request are processed simultaneously.

20. The one or more non-transitory computer-readable media of claim 17, wherein receiving the first web service request comprises:

receiving, at one of a plurality of application servers and from a batch utility server, the first web service request, wherein additional web service requests are routed to the remaining application servers of the plurality of application servers.

* * * * *